United States Patent [19]

Stuart

[11] Patent Number: 5,905,787
[45] Date of Patent: *May 18, 1999

[54] METHOD AND APPARATUS FOR INSTALLING TELEPHONE INTERCOM—VOICE MESSAGING APPARATUS AT DOORBELL FOR DWELLING

[76] Inventor: John C. Stuart, 7353 W. Vogel, Peoria, Ariz. 85345

[ * ] Notice: This patent is subject to a terminal disclaimer.

[21] Appl. No.: 08/811,498

[22] Filed: Mar. 5, 1997

[51] Int. Cl.⁶ ...................................................... H04M 1/60
[52] U.S. Cl. ............................ 379/167; 379/169; 379/67
[58] Field of Search ........................ 379/102.01, 102.02, 379/102.06, 170, 172, 167, 168, 169; 455/402

[56] References Cited

U.S. PATENT DOCUMENTS

| 4,715,060 | 12/1987 | Lipscher et al. | 379/70 |
| 4,764,953 | 8/1988 | Chern et al. | 379/355 |
| 4,769,837 | 9/1988 | McCormick et al. | 379/393 |
| 4,943,997 | 7/1990 | Chang | 379/160 |
| 4,987,589 | 1/1991 | Trell | 379/102.06 |
| 5,612,994 | 3/1997 | Chen | 379/167 |
| 5,657,380 | 8/1997 | Mozer | 379/88 |

*Primary Examiner*—Krista Zele
*Assistant Examiner*—Charles N. Appiah
*Attorney, Agent, or Firm*—Tod R. Nissle, P.C.

[57] ABSTRACT

A doorbell response system is utilized in a dwelling. The dwelling includes a telephone, includes a telephone line connected to the telephone, and includes a doorbell and a pair of doorbell electrical wires which power the doorbell. The doorbell response system is powered by the pair of doorbell electrical wires and includes an auxiliary doorbell button, a speaker, a microphone, and apparatus to initiate the dialing of a telephone number. The doorbell response system also includes a connector to connect the microphone and speaker to the telephone line to enable a first person to converse over the microphone and speaker with a second person on the telephone line, and, includes apparatus for eliminating the dial tone in the telephone line so that the first person can so converse with the second person.

1 Claim, 2 Drawing Sheets

METHOD AND APPARATUS FOR INSTALLING TELEPHONE INTERCOM—VOICE MESSAGING APPARATUS AT DOORBELL FOR DWELLING

BACKGROUND OF THE INVENTION

This invention relates to doorbells.

More particularly, the invention pertains to a doorbell response system which can be retrofit in an existing doorbell system without requiring the incorporation of new wiring in the existing doorbell system.

In a further respect, the invention pertains to a doorbell-telephone intercom system which can be utilized in conjunction with an existing doorbell and telephone(s) in a residence.

The use of an intercom system in a residence is well known in the art, with intercoms often being provided at the front door of the residence so that the inhabitants of the residence can converse with a visitor standing outside at the front door. The intercom includes a microphone for receiving verbal communications from the visitor standing at the front door, and includes a speaker for audibly relaying to the visitor comments made by the inhabitants of the residence.

In one such prior art system, the speaker and microphone are wired to a digital signal processor. The digital processor is spliced into the wiring leading from the doorbell button to the doorbell of the residence. The digital processor is also connected to a Public Switched Telephone Network (PSTN) just as if the digital processor were an ordinary telephone. When the doorbell button is actuated by a visitor standing at a door of the residence, the digital processor waits a predetermined length of time for a telephone in the residence to go off hook. If the residence phone is taken off hook by an inhabitant of the residence, then the phone is, without utilizing the PSTN, connected to the intercom to permit the inhabitant to speak to the visitor. If the residence phone does not go off hook, then the digital processor autodials a number over the PSTN to a remote telephone located outside the residence. See, for example, U.S. Pat. No. 4,764,953 to Chern et al. The use of a local or remote telephone to communicate with an intercom at the door of a residence is well known in the art. Although intercom-telephone systems are widely utilized in the art, such systems often have long standing disadvantages. First, the circuitry and/or components associated with such intercom-telephone systems is often complicated and requires the use of specialized telephony or other components. Second, prior art systems typically require the cutting or splicing of existing wiring and circuitry, making the retrofitting of such systems impractical. Once a residence has been constructed and the telephone and doorbell lines installed, most homeowners are not inclined to attempt to incorporate new wiring or system components in a wall. Third, while autodialing is a known feature of doorbell-intercom systems, such systems do not give a visitor the flexibility of selecting to leave a message or to communicate with the inhabitants of a residence. Fourth, prior art systems do not enable a visitor the ability to communicate over the PSTN with an inhabitant of the residence on every phone in the residence.

SUMMARY OF THE INVENTION

Accordingly, it would be highly desirable to provide an improved doorbell-intercom system which could be quickly installed without requiring the splicing or alteration of the existing wiring in a residence, which would be simple in manufacture, which would permit a visitor to call a remote telephone site, and which would permit a visitor to leave a message for the inhabitants of the residence.

Therefore, it is a principal object of the invention to provide an improved doorbell system.

A further object of the invention is to provide an improved method and apparatus for installing a doorbell-intercom system.

Another object of the invention is to provide an improved doorbell-intercom system which gives a visitor the ability to select whether to converse with an inhabitant of the residence, to leave a message, or to call a remote telephone.

BRIEF DESCRIPTION OF THE DRAWINGS

These and other, further and more specific objects and advantages of the invention will be apparent to those skilled in the art from the following detailed description thereof, taken in conjunction with the drawings, in which.

DETAILED DESCRIPTION OF THE INVENTION

Figure 1:
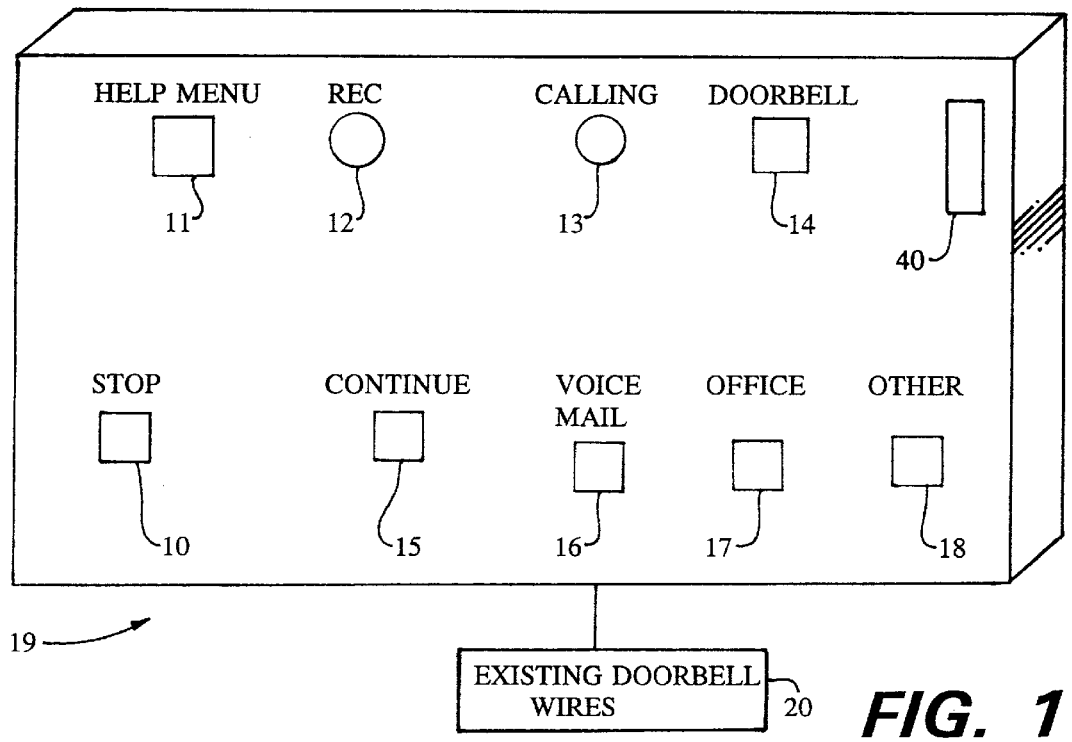
FIG. 1 is a perspective view illustrating a control unit mounted in the entryway of a residence and constructed in accordance with the principles of the invention.

Briefly, in accordance with the invention, I provide an improved method for installing a doorbell response system in a residence. The residence includes a doorbell system. The doorbell system includes a doorbell button, a pair of wires connected to the doorbell button, and a doorbell connected to the wires. The wires carry a selected current of less than about two amps and provide a voltage in the range of about eight to twenty-four volts. The residence also includes telephone lines, a telephone jack connected to the telephone lines, a telephone connected to the telephone lines and having an assigned telephone number utilized to call the telephone, a voice mail system operatively associated with the telephone to take messages when the telephone is unanswered, and a conventional 110 volt AC wall outlet. The improved method includes the steps of providing a first auxiliary unit including an auxiliary doorbell button, a speaker, a microphone, a dialing system activated by a user for creating an off hook situation or for initiating the dialing of a telephone number, and a first transmitter for transmitting and receiving signals. The auxiliary unit is powered by a current of less than about two amps and a voltage in the range of eight to twenty-four volts. The method also provides a second auxiliary unit including a plug for connecting the second unit to the 110 volt AC wall outlet to receive electrical power; a connector for connecting the second unit to the telephone outlet to enable a person to communicate via the microphone and speaker with another person speaking over the telephone lines; a system for eliminating for a selected period of time after the auxiliary door button is depressed the dial tone in the telephone lines so that a person may utilize the microphone and speaker to converse over the telephone lines with another person using the telephone(s) in the dwelling; a system for dialing a number when the dialing system is activated by a user to initiate the dialing of the assigned telephone number; and, a second transmitter for sending and receiving signals to and from said first transmitter. The method also provides an apparatus mounted in at least one of the first auxiliary unit and the second auxiliary unit to eliminate for a selected period of time after the auxiliary door button is depressed the dial tone in the telephone lines so that a person may utilize said microphone and speaker to converse over the telephone lines with another person using the telephone(s) in the dwelling, and to dial a number when the dialing system is activated by a user to initiate the dialing of the assigned telephone number. The method includes the additional steps of disconnecting the wires from the doorbell button; removing the doorbell button; connecting the wires to the first auxiliary unit to power said the auxiliary unit and connecting the second auxiliary unit to the telephone jack and the 120 volt AC wall outlet such that depressing the auxiliary doorbell button actuates the doorbell and eliminates the dial tone when a person in the dwelling uses the telephone(s) to speak via the second transmitter means and the first transmitter over the microphone and to hear voice communication directed into the speaker by a user, and such that the dialing system can be activated by a user to initiate via the first transmitter and the second transmitter the dialing of the assigned telephone number.

In another embodiment of the invention, I provide a doorbell response system for a residence. The residence includes a doorbell system including a primary doorbell button, a pair of doorbell button wires for connection to the doorbell button, and a doorbell connected to the wires. The wires carry a selected current of less than about two amps and providing a voltage in the range of about eight to twenty-four volts. The residence also includes telephone lines; a telephone jack connected to the telephone lines; a telephone connected to the telephone lines and having an assigned telephone number utilized to call the telephone; a voice mail system operatively associated with the telephone to take messages when the telephone is unanswered; and, a conventional 110 volt AC wall outlet. The doorbell response system includes a first auxiliary unit and a second auxiliary unit. The first auxiliary unit includes an auxiliary doorbell button; a speaker; a microphone; a dialing system activated by a user for initiating the dialing of a telephone number; and, a first transmitter for transmitting and receiving signals. The first auxiliary unit is connected to and powered by the doorbell button wires and replaces the primary doorbell button. The second auxiliary unit includes a plug for connecting the second unit to the 110 volt AC wall outlet to receive electrical power; a connector for connecting the second unit to the telephone outlet to enable a person to communicate via the microphone and speaker with another person speaking over the telephone lines; a system for eliminating for a selected period of time after the auxiliary door button is depressed the dial tone in the telephone lines so that a person may utilize the microphone and speaker to converse over the telephone lines with another person using the telephone(s) in the residence; a system for dialing a number when the dialing system is activated by a user to initiate the dialing of the assigned telephone number; and, a second transmitter for sending and receiving signals to and from the first transmitter. The doorbell response system also includes apparatus mounted in at least one of the first auxiliary unit and the second auxiliary unit to eliminate for a selected period of time after the auxiliary door button is depressed the dial tone in the telephone lines so that a person may utilize the microphone and speaker to converse over the telephone lines with another person using the telephone(s) in the dwelling, and to dial a number when the dialing system is activated by a user to initiate the dialing of the assigned telephone number.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates the door unit of the doorbell response system of the invention. The response system of the invention is preferably utilized in a residence. Residences included homes, business building structures, and other structures inhabited or occupied at least periodically by human beings. As will be explained, the door unit of FIG. 1 (and FIG. 2) interacts with the telephone interface unit illustrated in FIGS. 3 and 4.

The door unit 19 of FIG. 1 includes a rectangular housing. Mounted in housing 19 are buttons or touch pads 10, 11, 15, 16, 17, and 18. If desired, unit 19 can be adapted to receive voice commands or to utilize other communication systems besides buttons 10, 11, 15 to 18. LED's 12 and 13 are also mounted in housing 19, along with speaker 28, microphone 27, and transmitter-receiver 40. Unit 19 is mounted outside the door to a residence by removing the existing doorbell button and attaching unit 19 to the existing pair of wires which powered the removed existing doorbell button. This pair of wires subsequently provides the electrical power to operate unit 19. The pair of wires leading to a conventional doorbell button ordinarily carry about 0.6 to 0.7 amps of current and provide a voltage in the range of about eight to twenty-four volts.

When depressed or touched, button 11 activates a voice menu which causes audio signals to be produce by speaker 28. These audio signals consist of a person's voice explaining how the buttons on unit 19 are operated. Controller 24 (FIG. 2) senses when buttons 10, 11, 14 to 18 are depressed and, as will be described, generates appropriate responses and commands.

When depressed or touched, button 14 functions to close the circuit comprised in part of the existing doorbell wires so that the existing doorbell in the residence is actuated and rings. When depressed or touched, button 10 discontinues the connection between unit 19 and a telephone in the residence and also discontinues the dial tone block which occurs as a result of a visitor depressing button 14.

When depressed or touched, button 15 continues or re-initiates the dial tone block which permits the inhabitant of the residence to utilize a telephone in the residence to converse with a visitor over microphone 27 and speaker 28. After a visitor initially depresses button 14, the continue button ordinarily can only be depressed several times because if no call is dialed after about a minute, the telephone company switching station automatically initiates a busy signal, initiates a taped voice request that the caller dial a telephone number, or takes some other action automatically.

When depressed or touched, button 16 causes the number of the residence to be dialed so that, if the number is not answered, a message can be left on the voice mail of the residence telephone.

When depressed or touched, button 17 causes a number to be dialed which places a call to a telephone which is remote from the residence.

When depressed or touched, button 18 causes a number to be dialed which places a call to a telephone at a desired location at or remote from the residence.

Figure 2:
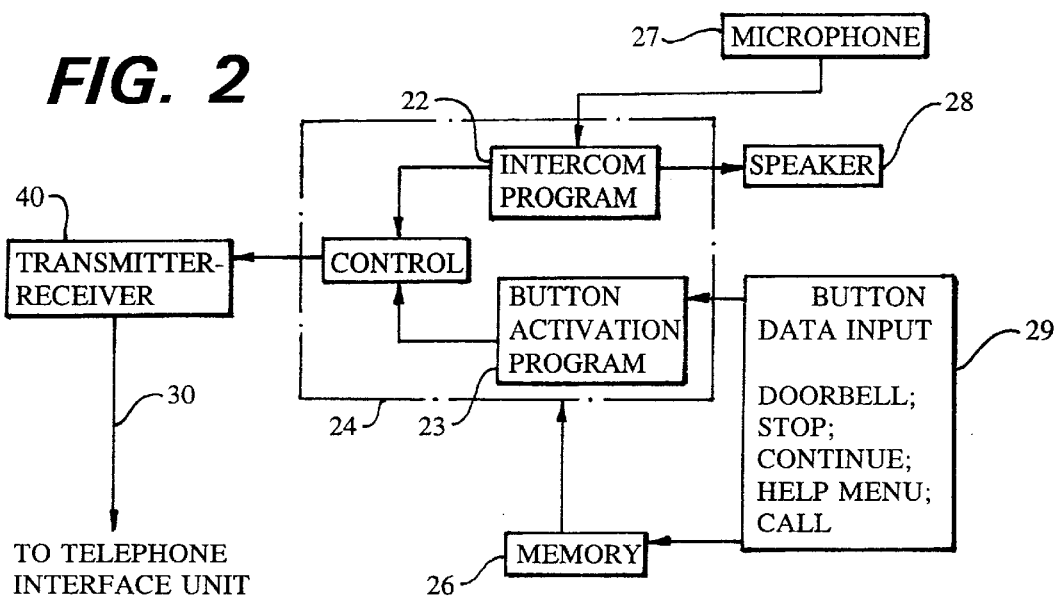
FIG. 2 is a block diagram illustrating the mode of operation of the control unit of FIG. 2.

The block diagram of FIG. 2 further illustrates unit 19 as including a computer or microprocessor including a controller 24 and a memory 26. Button data input 29 (signals from doorbell button 14, stop button 10, continue button 15, help menu button 11, a call button 16 to 18, from the telephone interface unit via transmitter-receiver 37, or, if desired, other or comparable data signals from a keyboard, punched card reader, paper tape reader, optical scanner, etc.), microphone 27, speaker 28, and transmitter-receiver 40 are also provided. A CRT or other data output means or display operatively associated with controller 24 can also, if desired, be provided and display information on a CRT screen.

The controller 24 can be a digital computer, analog computer, hybrid computer, or other programmable apparatus. In practice, the very large majority of computers comprise digital computers.

The memory 26 can be any suitable prior art memory unit such as are commonly used in digital or other computers. For example, electromagnetic memories such as magnetic, optical, solid state, etc. or mechanical memories such as paper tape.

Data can be input into memory 26 prior to the operation of the door unit of FIG. 2. Such data can be utilized by the button activation program 23 to interpret a signal received from transmitter-receiver 37 or from button data input 29 and to determine the proper commands to be issued by controller 24 in response to the signal. Similarly, data from memory 26 can be utilized by the intercom program to interpret a signal received from microphone 27, speaker 28, or transmitter-receiver 40 (from transmitter-receive 37) and to determine the proper commands to be issued by controller 24 in response to the signal. Various apparatus and procedures for transmitting and receiving audio signals from a microphone or telephone to a speaker via a telephone line and/or transmitter-receiver 40 is well known in the art and will not be detailed herein.

Figure 3:
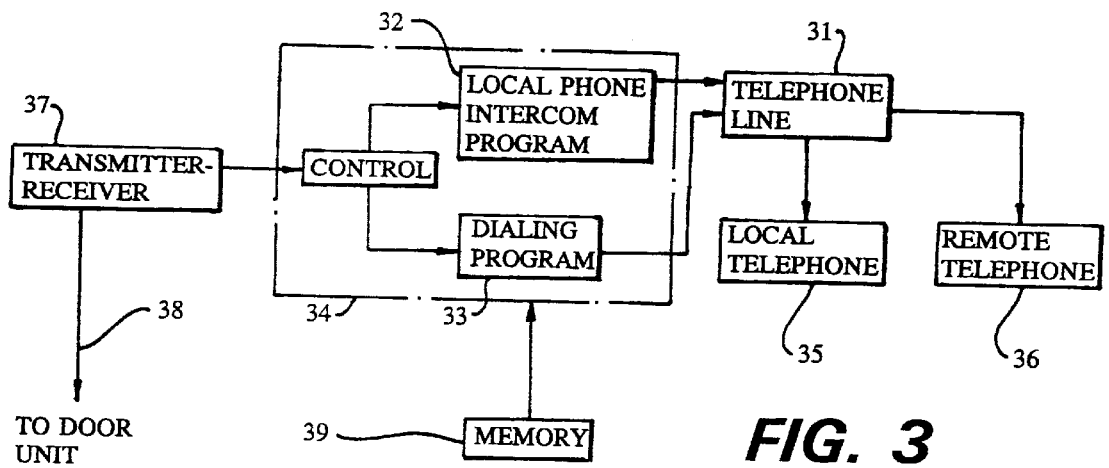
FIG. 3 is a block diagram illustrating a remote telephone interface unit utilized in accordance with the invention; and, FIG. 4 is a perspective view further illustrating the remote telephone interface unit of FIG. 3.

Data can be input into memory 39 prior to the operation of the telephone interface unit of FIG. 3. Such data can be utilized by the local phone intercom program 32 to interpret a signal received from transmitter-receiver 40 or from telephone line 31 and to determine the proper commands to be issued by controller 24 in response to the signal. Similarly, data from memory 39 can be utilized by the dialing program 33 to interpret a signal received from transmitter-receiver 40 and to determine the proper commands to be issued by controller 34 in response to the signal. Various apparatus and procedures for transmitting and receiving signals from a telephone line is well known in the art and will not be detailed herein.

The block diagram of FIG. 3 illustrates the remote telephone interface unit 50 (FIG. 4) as including a computer or microprocessor including a controller 34 and a memory 39. A transmitter-receiver 37 and interface with telephone line 31 are included. The telephone line interface typically comprises the cable 42 and clip 43 shown in FIG. 4. Clip 43 is removably clipped into a telephone wall jack in conventional fashion. Telephone line 31 is connected to a local telephone 35 in the residence at which the doorbell response system of the invention is installed, and is also connected to a telephone 36 which is remote from the residence at which the doorbell response system of the invention is installed. The transmitter-receiver sends signals to and receives signals from transmitter-receiver 40.

Figure 4:
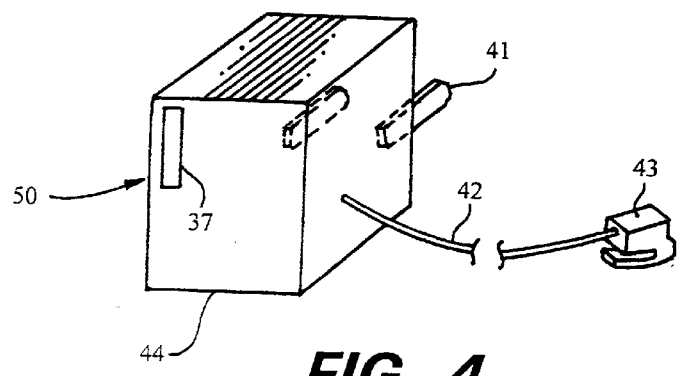

In FIG. 4, the telephone interface unit 50 includes housing 44, transmitter-receiver 37, a pair of prongs 41 for insertion in a conventional 110 volt AC wall outlet, cable 42 and clip 43.

In use, the doorbell button is removed from the existing doorbell at an entrance to a residence. The pair of wires which were connected to the existing doorbell button are connected to door unit 19 to provide the power for unit 19. The prongs 41 of telephone interface unit 50 are inserted in a 110 volt AC wall outlet and clip 43 is inserted in a telephone wall jack to connect unit 50 to the telephone line in the residence where units 19 and 50 are installed.

When a visitor presses button 11, button data input 29 transmits a signal to controller 24 which interprets the signal as being generated as the result of the visitor depressing button 11. Controller 22 commands the intercom program 22 send signals to speaker 28 such that the speaker 28 broadcasts sounds which produce a spoken verbal description of how unit 19 is operated by the visitor.

When a visitor presses button 14, button data input 29 transmits a signal to controller 24 which interprets the signal as being generated as the result of the visitor depressing button 14. Controller 22 commands the button activation program to close the circuit which includes the existing doorbell wires for a selected period of time so that the existing doorbell in the residence rings (or, pressing button 14 can physically close the circuit and cause the existing doorbell in the residence to ring). Controller 24 also directs transmitter-receiver 40 to send 30 a signal to transmitter-receiver 37 advising that button 14 has been depressed. Transmitter-receiver 37 transmits this information to controller 34 which utilizes the local phone intercom program 32 to produce a signal which is equivalent to dialing a "1" so that the dial tone on the local telephone is disabled and the inhabitant of the residence can pick up the local telephone(s) 35 and converse with the visitor via transmitter-receiver 37, transmitter-receiver 40, speaker 28, and microphone 27. If the inhabitant of the residence picks up the telephone(s) 35 at this point, has a conversation with the visitor, and hangs up, then the visitor can hit the stop button 10 to hang up the door unit, or, a timer in the door unit will automatically hang up the door unit after a preselected period of time has passed. When the door unit hangs up (after button 10 is pushed or when the timer in the door units hangs up the door unit), program 32 eliminates the dial tone disable so an incoming telephone call can be made to local telephone 35. If after ten to fifteen seconds, the inhabitant of the residence does not pick up the receiver of telephone(s) 35 and the visitor wishes to continue the dial tone disable, the visitor depresses the continue button 15. When the visitor presses button 15, button data input 29 transmits a signal to controller 24 which interprets the signal as being generated as the result of the visitor depressing button 15. Controller 22 directs transmitter-receiver 40 to send 30 a signal to transmitter-receiver 37 advising that button 15 has been depressed. Transmitter-receiver 37 transmits this information to controller 34 which utilizes the local phone intercom program 32 to produce a signal which is equivalent to dialing a "1" so that the dial tone disable on the local telephone is continued so that the inhabitant of the residence can pick up the local telephone(s) 35 and converse with the visitor via transmitter-receiver 37, transmitter-receiver 40, speaker 28, and microphone 27. Button 15 can presently be depressed only six times before telephone company switching equipment will interrupt and begin either requesting that a telephone number be dialed, or that a number has been misdialed. When the telephone switching equipment interrupts, the visitor can continue the conversation by depressing the stop button 10, ringing the doorbell 14 again, and by waiting for the inhabitant of the residence to again pick up and begin to converse with the visitor over the local telephone(s) 35. If a DTMF decoder is included in unit 19, then the inhabitant of the residence can press the number one button on his phone to continue the dial tone disable on the local telephone (s).

When a visitor presses button 16, button data input 29 transmits a signal to controller 24 which interprets the signal as being generated as the result of the visitor depressing button 16. Controller 22 directs transmitter-receiver 40 to send 30 a signal to transmitter-receiver 37 advising that button 16 has been depressed. Transmitter-receiver 37 transmits this information to controller 34 which utilizes the dialing program 33 and memory 39 to dial a pre-programmed number which calls telephone 35 such that telephone 35 in conventional fashion dials the phone number of the line it is on to access voice mail so the visitor can leave a message in voice mail. The visitor can, via speaker 28, hear the call being made and can leave a message in voice mail by speaking into microphone 27 which transmits the message into voice mail via program 22, transmitter-receiver 40, transmitter-receiver 37, dialing program 33, and telephone line 31. The use of voice mail to leave a message while dialing the phone number of the line you are on is well known and the apparatus for accomplishing such will not be outlined in detail here. Voice mail messages are readily retrieved by the inhabitant of a residence using his local telephone 35 to dial a seven digit number and then press selected number keys on telephone 35 to access the message, which is played back to the inhabitant over the speaker in the receiver of telephone 35.

When a visitor presses button 17, button data input 29 transmits a signal to controller 24 which interprets the signal as being generated as the result of the visitor depressing button 17. Controller 22 directs transmitter-receiver 40 to send 30 a signal to transmitter-receiver 37 advising that button 17 has been depressed. Transmitter-receiver 37 transmits this information to controller 34 which utilizes the dialing program 33 and memory 39 to dial a pre-programmed number which calls telephone 36 and which, in the event telephone 36 is not answered and voice mail is available for telephone 36, waits for voice mail to be accessed so the visitor can leave a message in voice mail. The visitor can, via speaker 28, hear the call being made and can leave a message in voice mail by speaking into microphone 27 which transmits the message into voice mail via program 22, transmitter-receiver 40, transmitter-receiver 37, dialing program 33, and telephone line 31. In the event an individual answers the call made to telephone 36, the visitor can also converse with that individual over microphone 27 and speaker 28 via program 22, transmitter-receiver 40, transmitter-receiver 37, etc.

When a visitor presses button 18, button data input 29 transmits a signal to controller 24 which interprets the signal as being generated as the result of the visitor depressing button 18. Controller 22 directs transmitter-receiver 40 to send 30 a signal to transmitter-receiver 37 advising that button 18 has been depressed. Transmitter-receiver 37 transmits this information to controller 34 which utilizes the dialing program 33 and memory 39 to dial a pre-selected number which calls a selected telephone other than telephone 35 or telephone 36.

The doorbell response system described herein is believed to be advantageous because it can be installed without cutting existing wire, breaking into existing walls, integrating new wiring or system components into a building structure, or redesigning existing telephone systems. Installation is unusually simple because it only requires that unit 50 be plugged into an outlet and telephone jack and that unit 19 take the place of the existing doorbell button. The doorbell response system of the invention also permits a visitor to select whether he wishes to speak with an inhabitant of a residence or simply wishes to leave a message. Finally, the system of the invention is provided with a help menu which describes to a visitor how the door unit is utilized.

In an alternate embodiment of the invention, a transmitter-receiver 40 is not utilized to send signals to transmitter-receiver 37. Instead transmitter-receivers 37 and 40 are eliminated and a wire interconnects door unit 19 and unit 50. Signals are transmitted from unit 19 over the wire to unit 50 and vice-versa.

In yet a further embodiment of the invention, transmitter-receivers 37 and 40 are eliminated, unit 50 (or the components comprising unit 50) is incorporated in door unit 19, and a wire interconnects unit 50 with telephone line 31. Unit 50 can be "hard wired" to telephone line 31, or, a cable 42 and clip 43 can be utilized to connect unit 50 to a wall mounted or other telephone jack.

Unit 50 can be powered by conventional 110 volt AC or by direct current supplied either by a battery or by an AC or a DC converter or step down transformer plugged into or connected to a 110 volt AC wall outlet.

Although not necessary, it is presently preferred that an incoming telephone call which causes a telephone in the dwelling to ring can not be accessed by a person standing at the front door of the dwelling and utilizing unit 19. The incoming call does not ring over speaker 28. If a person standing at the door is able to hear the ringer on a telephone in the dwelling, he still cannot utilize unit 19 to access the incoming call. As would be appreciated by those of skill in the art, a switch or other means can readily be incorporated in unit 19 to prevent access to an incoming call (i.e., a call from a telephone outside of and remote from the dwelling) to a telephone in the dwelling.

Having described my invention and the presently preferred embodiments thereof in a manner understandable to those of skill in the art, I claim:

1. In combination with a dwelling, said dwelling including a doorbell system including a pair of doorbell button wires for connection to a doorbell button, the wires carrying a selected current of less than about two amps and providing a voltage in the range of about eight to twenty-four volts, at least one telephone line, and a telephone connected to the telephone line and having an assigned telephone number utilized to call the telephone, a doorbell response system including an auxiliary unit connect to and powered by the doorbell button wires including (a) an auxiliary doorbell button;
(b) a speaker;
(c) a microphone;
(d) dialing means activated by a user for initiating the dialing of a telephone number;
(e) a connector for connecting said auxiliary unit to the telephone line to enable a person to communicate via said microphone and speaker with another person speaking over the telephone line;
(f) means for eliminating for a selected period of time after the auxiliary door button is depressed the dial tone in the telephone line so that a person may utilize said microphone and speaker to converse over the telephone line with another person using the telephone in the dwelling; and,
(g) means for dialing a number when said dialing means is activated by a user to initiate the dialing of a selected telephone number.

\* \* \* \* \*